Sept. 20, 1960
I. R. HICKS
2,953,025
BAROMETER
Filed Oct. 14, 1958
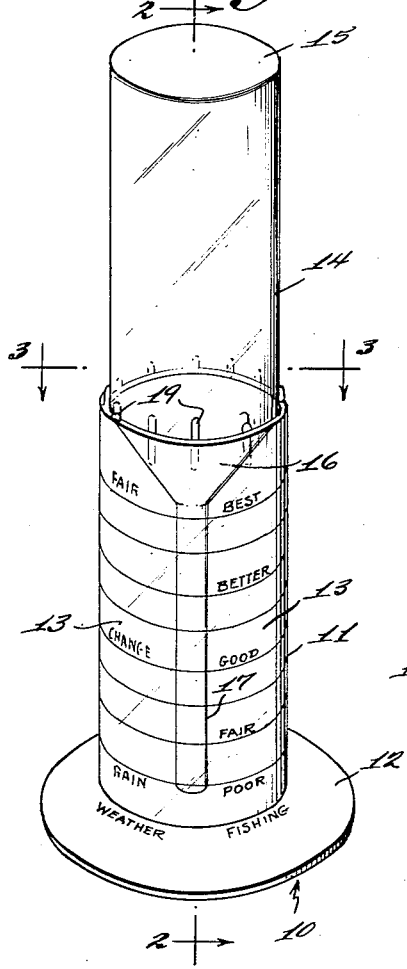
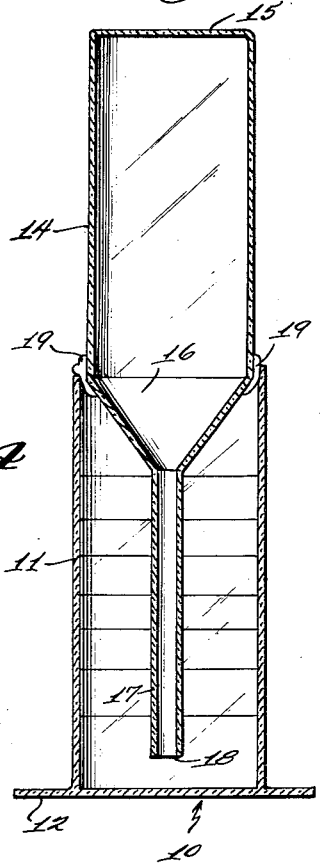
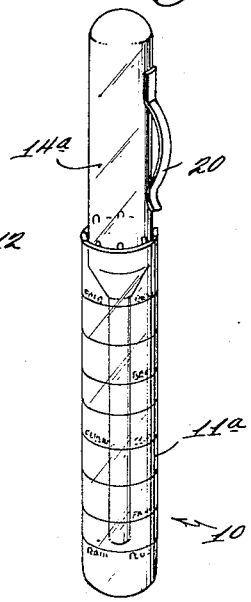
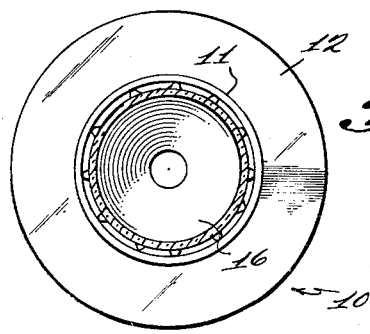
INVENTOR
IRL R. HICKS
BY Kimmel & Crowell
ATTORNEYS United States Patent Office 2,953,025
Patented Sept. 20, 1960

2,953,025
BAROMETER
Irl R. Hicks, P.O. Box 172, Centralia, Mo.
Filed Oct. 14, 1958, Ser. No. 767,149
1 Claim. (Cl. 73—384)

The present invention relates to barometers, and particularly to barometers for indicating atmospheric pressures.

The primary object of the invention is to provide an inexpensive barometer utilizing water as a medium on which the atmospheric pressures exert their force.

Another object of the invention is to provide a barometer of the class described above in which the barometer is formed in two easily assembled parts and can be quickly and easily disassembled for cleaning, filling and repairs as required.

A still further object of the invention is to provide a barometer of the class described above which is adapted to be carried in the pocket for use as required.

Other objects and advantages will become apparent in the following specification when considered in the light of the attached drawings, in which:

Figure 1 is a perspective view of the preferred form of the invention;

Figure 2 is a vertical section taken along the line 2—2 of Figure 1, looking in the direction of the arrows;

Figure 3 is a horizontal section taken along the line 3—3 of Figure 1, looking in the direction of the arrows; and Figure 4 is a perspective view of a modified form of the invention.

Referring now to the drawings in detail wherein like reference characters indicate like parts throughout the several figures, the reference numeral 10 indicates generally a barometer constructed in accordance with the invention.

The barometer 10 includes an upright open top cylinder 11 formed of clear plastic or glass and supported on a generally flat circular base 12 integrally formed on its lower end. The cylinder 11 is calibrated and provided with vertically spaced indicia 13, for reasons to be assigned. The cylinder 11 is sealed and has a quantity of water contained therein. A chamber 14 is of generally cylindrical form and has a closed top 15 formed thereon. The chamber 14 is necked down at 16 and has an integral elongated cylindrical tube 17 secured to its lower end. The lower end 18 of the tube 17 is open, as can be best seen in Figure 2. A plurality of upright flutes 19 are formed on the chamber 14 adjacent the necked down portion 16 to engage in the upper end of the cylinder 11 and maintain the chamber 14 spaced from the cylinder 11. The spacing of the chamber 14 from the cylinder 11 permits the passage of air therebetween and also positions the chamber 14 with respect to the cylinder 11. The lower end 18 of the tube 17 is immersed in the water in the cylinder 11 and the chamber 14 is filled with air at atmospheric pressure. The chamber 14 is formed of glass, or suitable clear plastic.

As the atmospheric pressures vary, their effect on the body of water in the cylinder 11 causes a column of water to rise and fall in the tube 17 to thus indicate the changes that can be expected in the weather. Since the rising and falling of the atmospheric pressure is directly related to the excellence of fishing, the cylinder 11 is calibrated in both a weather scale and a fishing scale, for the convenience of the fisherman.

In the modification illustrated in Figure 4, a barometer 10a comprises a cylinder 11a of smaller diameter than the cylinder 11 but similarly calibrated. A chamber 14a is related to the cylinder 11a in the same manner that the chamber 14 is related to the cylinder 11 and a pocket clip 20 is provided on the chamber 14a to permit the barometer 10a to be supported in the pocket when not in use. The cylinder 11a has no base and is held in the hand when in use.

While water has been disclosed above as the fluid contained in the cylinders 11, 11a, and on which the forces of atmospheric pressure are exerted, it should be understood that other fluids such as alcohol may be used to prevent freezing.

It should be further noted that the flutes 19 disclosed as being mounted on the chamber 14 may in some cases be formed on the inner surface of the upper portion of the cylinder 11 to serve the same purpose.

Having thus described the preferred embodiments of the invention, it should be understood that numerous structural modifications and adaptations may be resorted to without departing from the scope of the appended claim.

What is clamed is:

A barometer comprising an upright transparent cylinder having an upper circular rim, said cylinder having scales calibrated thereon, a cylindrical transparent air chamber of substantially the same diameter as said cylinder in the upper end of said cylinder having a tapering lower portion, a tube depending from said lower portion into said cylinder to a point adjacent the bottom thereof, annularly spaced flutes on said chamber at the juncture with said tapering lower portion maintaining said chamber in spaced relation on said rim, a body of water in said cylinder movable under atmospheric pressure in said tube indicating changes in atmospheric pressure along said scales, and an integrally formed base at the lower end of said cylinder.

References Cited in the file of this patent

UNITED STATES PATENTS

| | | |
|---|---|---|
| 784,986 | Chaney | Mar. 14, 1905 |
| 1,353,482 | Krause | Sept. 21, 1920 |
| 1,377,578 | Harris | May 10, 1921 |
| 1,632,084 | Klopsteg et al. | June 14, 1927 |
| 2,690,675 | Farrier | Oct. 5, 1954 |

FOREIGN PATENTS

| | | |
|---|---|---|
| 745,892 | Germany | Nov. 27, 1944 |

OTHER REFERENCES

Schaar: "Selected Laboratory Equipment," May 9, 1950, page 292, Figure F6760.